US006863245B2

(12) United States Patent
Gessler et al.

(10) Patent No.: US 6,863,245 B2
(45) Date of Patent: Mar. 8, 2005

(54) AERODYNAMIC PROFILE WITH AN ADJUSTABLE FLAP

(75) Inventors: Andreas Gessler, Haar (DE); Heinz Hansen, Weyhe (DE); Tamas Havar, Stuttgart (DE); Alexander Horoschenkoff, Taufkirchen (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 10/291,750

(22) Filed: Nov. 12, 2002

(65) Prior Publication Data

US 2003/0102410 A1 Jun. 5, 2003

(30) Foreign Application Priority Data

Nov. 19, 2001 (DE) .......................................... 101 56 733

(51) Int. Cl.⁷ ................................................ B64C 3/50
(52) U.S. Cl. ........................ 244/215; 244/217; 244/130
(58) Field of Search ................................ 244/215–217, 244/219, 75 R, 213, 130

(56) References Cited

U.S. PATENT DOCUMENTS

| | | | | |
|---|---|---|---|---|
| 1,729,210 A | * | 9/1929 | Dilage ........................ | 244/215 |
| 1,822,940 A | * | 9/1931 | Sundstedt .................... | 244/123 |
| 1,893,065 A | * | 1/1933 | Zaparka ...................... | 244/215 |
| 3,883,093 A | * | 5/1975 | Violleau ...................... | 244/123 |
| 5,884,872 A | | 3/1999 | Greenhalgh | |
| 5,924,649 A | * | 7/1999 | Piening et al. .............. | 244/123 |
| 6,168,379 B1 | * | 1/2001 | Bauer ........................ | 244/215 |
| 6,220,551 B1 | * | 4/2001 | Saiz ........................... | 244/217 |
| 6,234,423 B1 | * | 5/2001 | Hirahara et al. ............ | 244/123 |
| 6,565,045 B1 | * | 5/2003 | Correge et al. ............. | 244/215 |

FOREIGN PATENT DOCUMENTS

| | | |
|---|---|---|
| DE | 4107556 C1 | 5/1992 |
| WO | WO 00/63071 | 10/2000 |

OTHER PUBLICATIONS

Cory S. Jang et al., "Computational Evaluation of an Airfoil with a Gurney Flap", AIAA–92–2708–CP, American Institute of Aeronautics and Astronautics, Inc., 1992, pp. 801–809.

* cited by examiner

Primary Examiner—Galen Barefoot
(74) Attorney, Agent, or Firm—Crowell & Moring LLP

(57) ABSTRACT

An aerodynamic profile has an adjustable flap, which has a forward profile area as well as a rearward profile area situated in the downward current, bounded by a pressure-side covering skin as well as a suction-side covering skin. The pressure-side and suction-side covering skins converge in the rearward profile area at a trailing profile edge. In the rearward profile area on the underside of the pressure-side covering skin, a flap is swivellably disposed such that, in the inoperative condition, the flap, pointing in the flow direction, rests against the contour of the pressure-side covering skin and, in the deflected condition, the flap encloses an angle with the pressure-side covering skin. An airtight hinge connection is integrated in the flap so that, on the side of the flap protected from the wind, a turbulence system which improves the flow conditions is formed.

14 Claims, 3 Drawing Sheets

AERODYNAMIC PROFILE WITH AN ADJUSTABLE FLAP

This application claims the priority of German application 101 56 733.2, filed Nov. 19, 2001, the disclosure of which is expressly incorporated by reference herein.

BACKGROUND AND SUMMARY OF THE INVENTION

The present invention relates to an aerodynamic profile with an adjustable flap, having a forward profile area as well as a rearward profile area situated in a downward current, bounded by pressure-side and suction-side covering skins, the pressure-side covering skin and the suction-side covering skin converging, in the rearward profile area, at a trailing profile edge.

Such aerodynamic or lifting-force-generating profiles are typically lifting surfaces and rotor blades on the trailing edges of which landing or control flaps are arranged. As a result of an up and down movement of such a flap, an aerodynamic control effect is caused in a known manner. This is required particularly because of the different aerodynamic requirements during take-off and landing so that it has to be possible to implement corresponding flap positions in the course of different flight phases.

A conventional airplane wing structure with a flap is described, for example, in German Patent Document DE 41 07 556. In this structure, a landing flap is arranged on the trailing edge of the airplane wing. The landing flap is rotatably linked to a carriage movably arranged on a guide rail and is thereby displaceable, while a linked lever changes the angle of the landing flap in an extending movement. In the take-off or landing phase, the wing surface is enlarged by moving the flap out toward the rear, and the profile contour is changed by the angle change.

However, with a view to future applications, it is problematic that, with previously known control flaps, expected rising demands on passenger planes, as a result of an increase in air traffic, will not be met or will not be met sufficiently effectively. One of these demands is, for example, the need to increase the climbing and descent rates for reducing noise in approach zones and for increasing take-off and landing frequency. In addition, in the future, improvements to adaptability are required for an optimal $C_a/C_w$ ratio for reducing consumption because, as a result of the high traffic volume, adaptation by way of the traveling altitude is possible only to a limited extent. Furthermore, load redistributions increasingly have to be taken into account for reducing weight and consumption.

In order to meet these new demands, most recently, novel small control flaps, called miniflaps, have been examined. Such miniflaps differ from conventional flaps with depths of 10–30% clean wing chord depth in that they only have very low depths of from 1–3% and, as in the case of a split flap, have a stationary part and an extended part. One miniflap of this type is the so-called Gurney flap which is known in the field of aerodynamics and is described, for example, in "Computational Evaluation of an Airfoil with a Gurney Flap", C. S. Jang, J. C. Ross, R. M. Cummings, ALAA-92-2708-CP. The Gurney flap is arranged at the end of an aerodynamic profile as a rigid thickening fixedly on its pressure-side covering skin. In this case, the flap encloses a fixed angle with the pressure-side covering skin, which typically amounts to maximally 90°. A turbulence system is formed in the wake of the flap, which improves the top surface flow and causes a strong flow deflection at the trailing edge of the profile which, in turn, clearly improves the lift of the aerodynamic profile. An airtight construction of the transition area between the pressure-side covering skin and the flap can improve the lift-increasing effect of the miniflap. So far, it has only been possible to technically ensure the required gap tightness at the transition area by rigidly connecting the flap with the profile underside. The known Gurney flap therefore has the disadvantage that its aerodynamic effect cannot be varied.

It is therefore an object of the invention to further develop an aerodynamic profile based on the known operating principle such that the flap mounted on the profile has an adjustable construction and its aerodynamic effect can be adjusted. It is another object of the invention to construct the aerodynamic profile with the adjustable flap in a maintenance-friendly manner, with a simple construction, and at reasonable production cost.

These objects are achieved by way of an aerodynamic profile in which, in the rearward profile area on the underside of the pressure-side covering skin, a flap is swivellably disposed such that, in an inoperative position, the flap, pointing in the flow direction, rests against the contour of the pressure-side covering skin and, in a deflected condition, encloses an angle with the pressure-side covering skin. An airtight hinge connection is integrated in the flap so that a turbulence system improving the flow conditions is formed on the side of the flap sheltered from the wind.

This arrangement has an advantage in that an airtight flap linkage is ensured during adjustment of the flap so that the aerodynamic effect of the flap can be adjusted. As a result, adaptability to the rising demands on today's passenger planes mentioned above is ensured.

An arching-in is preferably formed in the pressure-side covering skin in the transition area to the flap. This arching-in is adapted to the shapes of the hinge connection and the flap. In this case, the arching-in radius corresponds to the curvature of the hinge connection. As a result, the aerodynamic drag of the flap is reduced in the inoperative condition and, because it rests against the hinge connection, the arching-in has an advantageous effect on the gap tightness of the transition area.

Particularly preferably, the flap is of a fiber composite material. As a result, integration of the hinge connection in the flap is permitted in a simple manner. In addition, such a flap has sufficient stability that it can extend over a wide area in the wing span direction. Simultaneously, a weight reduction is achieved, which is advantageous particularly with respect to fuel consumption. Another advantage is that the height of the flap or of the hinge connection is very low because of the narrow material thickness of the fiber composite. As a result, hardly any additional aerodynamic drag is generated in the inoperative condition.

According to a first embodiment of the invention, the flap is of a laminated, folded prepreg material; in this case, an airtight loop area is formed along the fold, and a sliding material is inserted and a torsion bar can be introduced into the loop area. Because of the folded arrangement, an airtight flap linkage is reliably ensured along the entire flap dimension in the wing span direction. In addition, the flexibility of the material easily permits close contact with the arching-in provided in the pressure-side covering skin. This additionally improves the airtightness of the flap linkage.

According to another embodiment, the flap is formed of unidirectionally and multidirectionally reinforced fiber composite arrangements which are sewn to one another, impregnated and hardened. Consequently, in the area of the unidirectional fiber composite arrangement, a reinforced airtight loop area is created into which a sliding material is inserted, and a torsion bar can be introduced for the rotatable bearing of the flap. Likewise, in the first embodiment, the flap, constructed of a sewn-together fiber composite arrangement, is advantageously characterized in that an effective airtight flap linkage is permitted with a corresponding dimensional adaptability to the pressure-side covering skin. In addition, this further development, in comparison to the arrangement of a prepreg material, has the advantage that the loop area is reinforced by the unidirectional fiber composite arrangement, preferably in the thickness direction. In addition to the reinforcement, among other things, a delamination of the flap in the symmetry plane starting from the loop area is prevented.

The loop area expediently has milled-out areas so that the flap has a plurality of individual loops into which the torsion bar can be introduced. In a simple manner, this creates space for mounting a corresponding counterpart of the hinge connection on the torsion bar without impairing the gap tightness of the flap linkage.

Preferably, a corresponding counterpart is also arranged on the torsion bar. The counterpart can be of a fiber composite, aluminum, or another sheet-metal-type metallic material, and can have fastening loops. The torsion bar is non-rotatably connected with the fastening loops and is rotatably disposed in the loops of the flap, or vice versa. The possibility of being able to use different materials is advantageous here.

Furthermore, recesses are advantageously provided in the pressure-side covering skin. These recesses significantly facilitate fastening of the flap on the pressure-side covering skin. In this case, it is expedient to introduce corresponding fastening areas of the fastening elements into the recesses and to mount them by gluing and/or riveting on the pressure-side covering skin.

Advantageously, connection elements are arranged between the suction-side and the pressure-side covering skin. These connection elements are constructed in a rib shape and are arranged extending in the flow direction. As a result, a monolithic construction is achieved, which is advantageous with respect to reducing weight.

A connection profile is expediently arranged between the spaced covering skins. By way of the connection profile, the rearward profile area can be mounted on the forward profile area. In this manner, the rearward profile area can be easily exchanged in the event of damage to the flap or to another component. This can be implemented, for example, by the opening up of a bolt connection between the connection profile and rearward profile areas. In this case, care should be taken to adapt the dimensions of the forward and rearward profile areas correspondingly in order to obtain a constant flow surface.

In addition, it is advantageous to provide a fastening part on the underside of the flap, to which fastening part the adjusting lever is linked by way of a hinge point.

The actuator is advantageously arranged in the forward profile area. As a result, an exchange of the rearward profile area can be carried out unhindered, so that short maintenance times are required.

It is expedient to produce the suction-side covering skin, the pressure-side covering skin, the connection elements, and the connection profile of aluminum. This ensures sufficient protection against lightening.

The invention will be explained in detail by way of attached drawings.

DETAILED DESCRIPTION OF THE INVENTION

Figure 1:
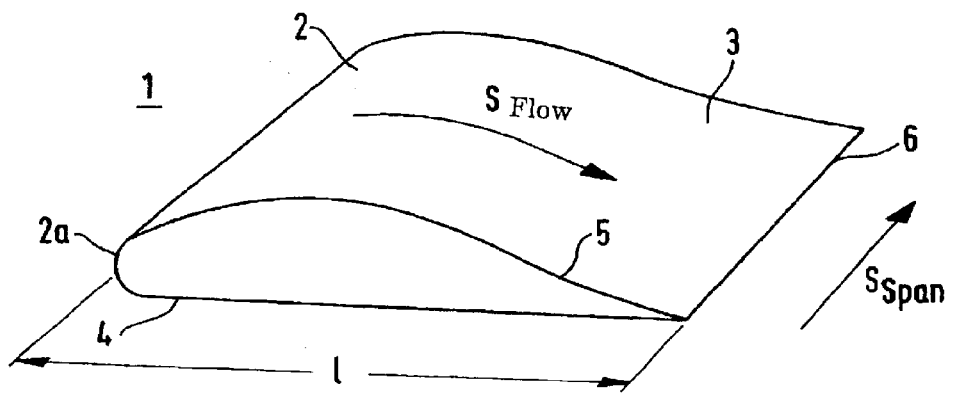
FIG. 1 is a schematic three-dimensional view of an aerodynamic profile of the above-mentioned type.

FIG. 1 is a general schematic three-dimensional view of an aerodynamic profile. The profile 1 has a forward profile area 2 as well as a rearward profile area 3 which is situated in the downward current. In FIG. 1, the flow direction is indicated by the arrow $S_{Flow}$. In a known manner, the profile 1 is bounded by a pressure-side covering skin 4 and a suction-side covering skin 5 which in the rearward profile area 3 converge in a trailing profile edge 6. In this case, the trailing profile edge 6 extends in the wing span direction $S_{span}$. The extension from the profile nose 2a to the trailing edge 6 is called the profile depth 1. Such an aerodynamic profile is, for example, a helicopter rotor blade or an airplane wing, as is well known from the state of the art, so that further details do not have to be described. Furthermore, the aerodynamic profile may also be a landing or control flap mounted on a rotor blade or on any of a wing surface, a horizontal tail unit surface and a rudder unit surface.

Figure 2:
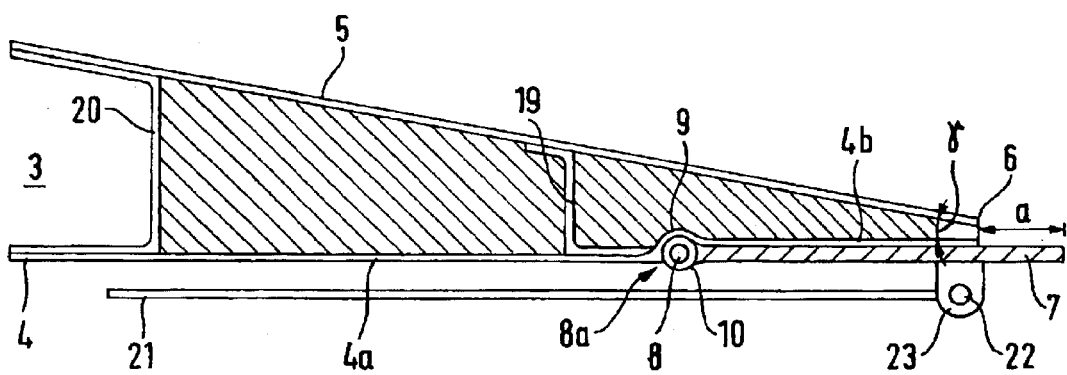
FIG. 2 is a sectional view of the rearward profile area of the aerodynamic profile according to the invention.

For reasons of clarity, FIG. 2 shows the rearward profile area 3 of the aerodynamic profile in a sectional view in an enlarged manner and in detail. In the following description, this part of the aerodynamic profile is also called a trailing edge structure. In FIG. 2, corresponding components are indicated by the same reference numbers as in FIG. 1. In the embodiment according to FIG. 2, convergence of the pressure-side and suction-side covering skins 4, 5 at the trailing edge 6 takes place such that the suction side-covering skin 5 is arranged at an acute angle γ with respect to the pressure-side covering skin 4. In addition, a flap 7 is swivellably arranged on the underside of the pressure side covering skin 4. The swivelling axis 8 extends parallel to the trailing edge 6 and thus perpendicular to the plane of the drawing of FIG. 2. In the inoperative position illustrated in FIG. 2, which is also called a "retracted condition", the flap 7, pointing in the flow direction, rests on the pressure side covering skin 4 so that almost no additional aerodynamic drag is caused by the flap 7. In this case, the flap protrudes beyond the trailing edge 6 by section a. This protrusion typically amounts to approximately 0.5% of the profile depth 1 but may also be reduced to 0% of the profile depth.

In order to further reduce possible influences of the retracted flap 7 on the aerodynamic drag, the pressure-side covering skin 4 in the area of the flap linkage, that is, in the transition area 8a from the pressure-side covering skin 4 to the flap 7, is adapted to the shape of the flap 7 or its hinge-type connection 10. For this purpose, the pressure-side covering skin 4 has an arching-in 9 pointing in the direction of the profile interior for accommodating the flap 7. In this case, the section 4a of the pressure-side covering skin situated in front of the arching-in 9 and the section 4b situated, viewed in the flow direction, behind the arching-in 9 extend approximately parallel to one another. The section 4b adjoining the arching-in 9 in the direction of the trailing edge 6, relative to section 4a situated in front of the arching-in, is offset in the direction of the profile interior. This causes an effective installation of the flap so that, in the inoperative condition, the latter is in a close contact with the rearward section 4b of the pressure-side covering skin.

In the deflected condition of the flap (not shown), the flap 7 encloses an angle of maximally 90° with the pressure-side covering skin 4. In this case, adjustment of the flap 7 takes place by way of an adjusting lever 21 which extends essentially parallel to the pressure-side covering skin 4 and, by way of a hinge point 22, is movably arranged on a fastening part 23 of the flap 7. Operation of the adjusting lever 21 takes place by way of an actuator (not shown). The adjusting frequency of the actuator typically amounts to several Hz for the deflection of the flap. Preferably, a frequency of <1 Hz is selected.

As initially mentioned, for generating a lift-improving turbulence system on the side of the flap sheltered from the wind, a high gap tightness is required. This is implemented by integrating a hinge connection 10 in the flap 7, which will be discussed in detail.

Figure 3:
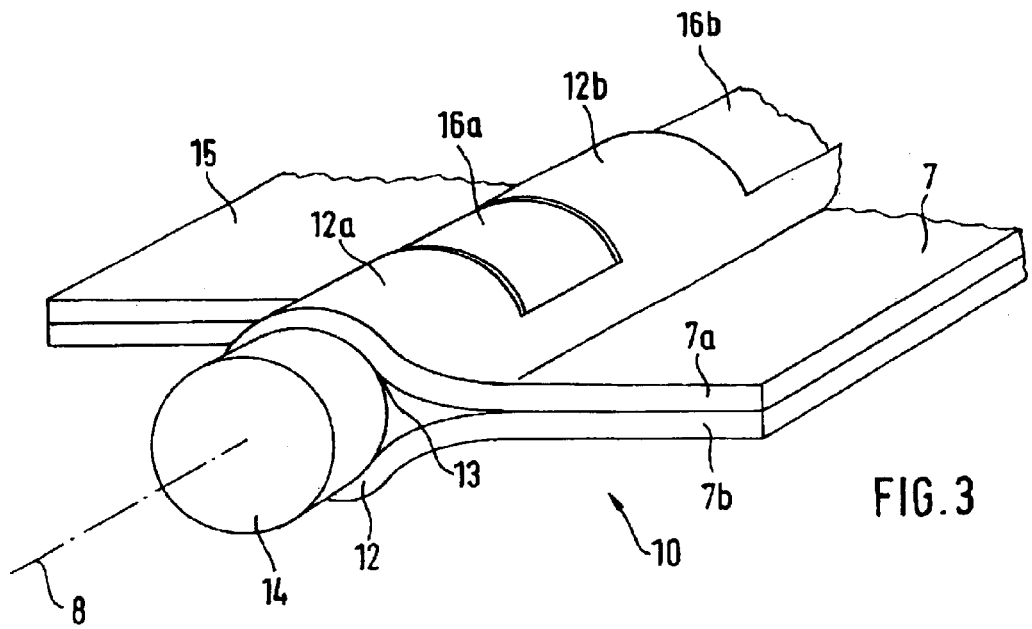
FIG. 3 is a basic diagram of a flap made of a fiber composite material with an integrated hinge connection.

According to a first embodiment, the flap 7 is of a so-called prepreg material. It is known that the term "prepreg" indicates a preimpregnated fiber arrangement. The flap 7 has a plurality of prepreg strips which are laminated for forming a loop area 12 to the symmetry plane of the flap 7 and are then folded together (FIG. 3). Thus, the thickness of the flap 7 is composed of the sum of the respective thicknesses of the symmetrical partial layers which, in FIG. 3, have the reference numbers 7a and 7b respectively. As a result of the folding along the symmetry plane, the loop area 12, which takes over the function of the flap bearing, is formed. Furthermore, a sliding material 13 (such as a PTFE liner) is arranged in the loop area 12 so that the torsion bar 14 introduced into the loop area is supported as free of friction as possible and thereby reduces the wear characteristics. In FIG. 3, the sliding material 13 is situated on the torsion bar 14.

Figure 4:
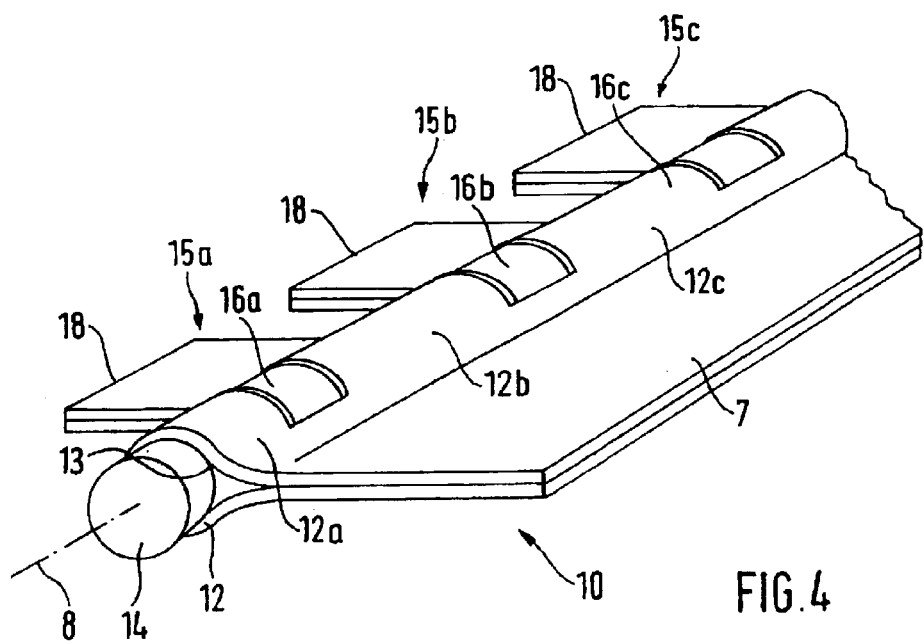
FIG. 4 is a view of an alternative embodiment of the hinge connection according to FIG. 3.

The flap 7 made of a prepreg material forms the first part of the hinge-type connection 10 illustrated in FIG. 3 and FIG. 4 respectively. In addition, the loop area 12 of the flap 7 has a plurality of milled-out areas so that a plurality of individual loops 12a, 12b, etc. remains. In this case, it is advantageous that, particularly in the case of a further development of the flap by the prepreg technology, milling-out is possible in a precise manner and therefore with very narrow tolerances. By way of the milled-out areas, space is created for mounting a corresponding counterpart in order to fasten the flap on the pressure-side covering skin. The counterpart or the second part of the hinge-type connection 10 is indicated by reference number 15 in FIG. 3. Analogous to the flap-shaped part of the hinge connection 10, the counterpart can be produced as a one-piece further development and has individual fastening loops 16a, 16b, etc. When the torsion bar 14 is introduced, the loops are spaced away from one another such that the flap loops 12a, 12b, etc. and the fastening loops 16a, 16b, etc. alternate. In this case, each of the fastening loops 16a, 16b, etc. is arranged in one of the milled-out areas of the flap 7, as illustrated in FIG. 4 as well as in FIG. 5. However, in order to ensure the swivellability of the flap, in contrast to the flap loops 12a, 12b, etc., the torsion bar 14 is non-rotatably arranged in the fastening loops 16a, 16b, etc. Naturally, the flap loops 12a, 12b, etc. can also be non-rotatably connected with the torsion bar 14 and the fastening loops 16a, 16b, etc. by using a sliding material rotatably disposed about the axis of rotation 8.

According to an alternative embodiment, the counterpart 15 is constructed in sections, as illustrated in FIG. 4. In this case, the individual sections—in the following, also called fastening elements—are analogously indicated by reference numbers 15a, 15b and 15c. This has the advantage of weight reduction while maintaining a sufficient stiffness or stability of the structure. On the other hand, in this embodiment, the counterpart may be of a fiber composite material as well as of a metallic material since, because of the further development in sections, the dimensions in the span direction of each individual fastening element produced by folding-over are relatively small. This means that, during the folding operation required for producing the counterpart, the danger of tensions and cracks occurring is reduced. In contrast, in production of the flap 7, because of its extension in the span direction of up to 17 m, folding along the symmetry plane can hardly be achieved by conventional metal sheets, so that the required gap tightness cannot be achieved by conventional metallic materials.

Figure 5:
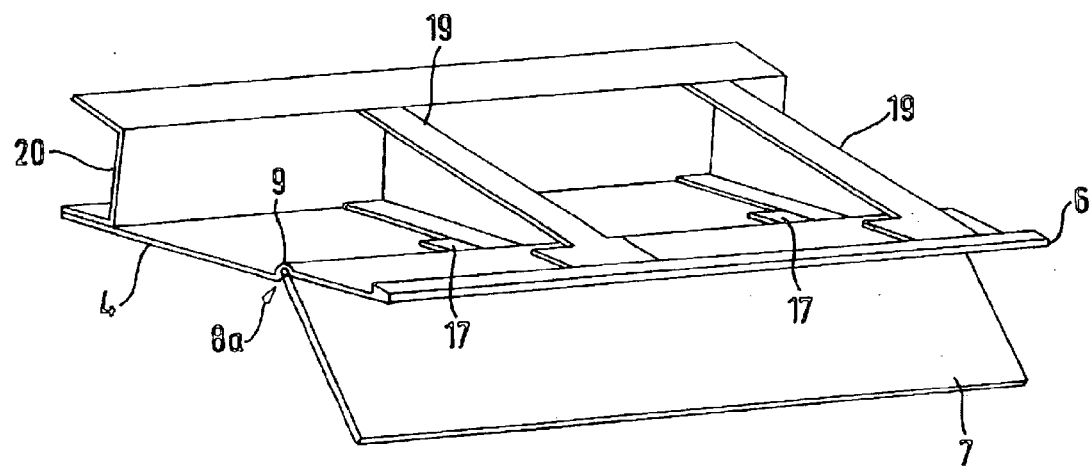
FIG. 5 is a schematic three-dimensional view of the rearward profile area illustrated in FIG. 2.

For mounting the hinge-type connection 10 on the pressure-side covering skin 4, as illustrated in FIG. 5, recesses 17 are provided in the pressure-side covering skin 4. These milled-out recesses 17 extend in the span direction along the arching-in 9. The dimensions of the recesses 17 are adapted to the corresponding fastening areas 18 of the fastening elements 15a, 15b, 15c. The fastening areas 18 are introduced into these recesses 17 and are glued and/or riveted to the pressure-side covering skin 4.

According to a second embodiment, the flap with an integrated hinge connection 10 can be produced by way of a conventional textile technology method. In this embodiment, the flap 7 has two different multiaxial arrangements, specifically, a unidirectionally as well as a multidirectionally reinforced arrangement, preferably a CFK arrangement. The layers are placed above one another corresponding to the thickness of the flap and are sewn together, the unidirectional arrangement being arranged in the loop area 12. This causes a three-dimensional reinforcement of the flap 7 in the loop area 12. In addition, by way of such an arrangement, delamination of the flap 7 in the symmetry plane starting from the loop area 12 is avoided. As in the case of the above discussed prepreg variant, a sliding material, such as a PTFE liner, is situated in the loop area 12. Here, the inside diameter of the loop area 12 is also defined by the diameter of a shaping bar which is removed after resin injection. The sliding material 13, in turn, remains in the loop area 12 for reducing frictional forces. Also, in this embodiment, after hardening, loops 12a, 12b, 12c are milled out at a high precision and, analogous to the above-discussed embodiment, together with a counterpart 15 or fastening elements 15a, 15b, 15c, are arranged along a torsion bar 14. In this case, the counterpart 15 or each individual fastening element 15a, 15b, 15c may be of sheet metal, prepreg material or a textile arrangement. The textile technology variant, however, has the advantage of lower-cost production. It also has a lower weight and, in contrast to the prepreg variant, is distinguished by a reinforcement in the loop area 12 in the thickness direction.

Figure 6:
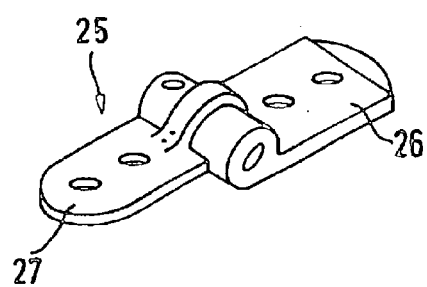
FIG. 6 is a view of a conventional hinge bearing for mounting the flap on the pressure-side covering skin.

For reasons of completeness, it should be mentioned that, according to another embodiment, conventional hinge bearings qualified for aviation according to DZ-0396-3, in principle, are also suitable for the flap linkage but are not preferable to the above-described further developments made of a fiber composite material because a gap tightness can be achieved which is not as high. Such a hinge bearing 25 is illustrated in FIG. 6. The hinge bearing has two hinge parts 26, 27. One hinge part 26 is mounted, for example, by way of rivets (not illustrated) on a flap made of a fiber composite material. The other hinge part is fastened, for example, on the pressure-side covering skin 4. However, in contrast to the further developments made of a fiber composite material, the height of the hinge bearing is larger than the hinge connection 10 integrated in the flap 7. The diameter of the conventional hinge bearing is typically larger than 12 mm.

According to another preferred embodiment, the trailing edge structure illustrated in FIG. 2 has a monolithic construction, which is illustrated in FIG. 5. For showing the construction, FIG. 5, however, does not show the suction side covering skin. As illustrated in FIGS. 2 and 5 respectively, the pressure-side covering skin 4 is spaced away from the suction-side covering skin 5 by way of rib-shaped connection elements 19 extending in the flow direction. In addition, a connection profile 20 is provided between the pressure-side covering skin 4 and the suction-side covering skin 5. By way of the connection profile 20, the entire trailing edge structure can be exchanged in a simple manner. For this purpose, the connection profile 20 can be demounted from and mounted on an end spar (not shown) of a wing, of a landing flap or the like by way of separable rivets. This has the advantage that the trailing edge structure, together with the flap, can be rapidly replaced as a unit for a corresponding exchange part, so that, in the case of damage to the flap, the entire trailing edge structure is exchanged. In this manner, simple and effective maintenance can be obtained at reasonable cost. In order to further reduce maintenance expenditures, the actuator (not shown) operating the adjusting lever 21 is preferably arranged outside the trailing edge structure, that is, within the forward profile area 2.

Finally, it should be noted that the pressure-side covering skin 4, the suction-side covering skin 5, the ribs 19, and the connection profile 20, for protection against lightening, are preferably made of aluminum. In order to further improve protection against lightening, copper mesh, as well as a ground strap, may additionally be laminated into the fiber composite material.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

We claim:

1. An aerodynamic profile having a forward profile area as well as a rearward profile area which is situated in a downward current and is bounded by a pressure-side covering skin as well as a suction-side covering skin, the pressure-side covering skin and the suction-side covering skin converging at the rearward profile area in a trailing profile edge, comprising:

a flap swivellably disposed in the rearward profile area on an underside of the pressure-side covering skin such that, in an inoperative condition, the flap, pointing in a flow direction, rests against a contour of the pressure-side covering skin and, in a deflected condition, encloses an angle with the pressure-side covering skin, and an airtight hinge connection integrated in the flap so that, on a side of the flap protected from wind, a turbulence system which improves flow conditions is formed wherein the flap is made of a laminated folded-together prepreg material and an airtight loop area is formed along a fold in the material.

2. The aerodynamic profile according to claim 1, wherein the loop area has milled-out areas so that the flap has a plurality of individual loops into which the torsion bar can be inserted.

3. The aerodynamic profile according to claim 2, wherein, in addition, a counterpart is arranged on the torsion bar, which counterpart is made of a fiber composite material, aluminum, or another sheet-metal-type material and has fastening loops, and wherein the torsion bar is non-rotatably connected with the fastening loops and is rotatably disposed with the individual loops of the flap, or vice-versa.

4. The aerodynamic profile according to claim 1, wherein a sliding material is insertable into the loop area for rotatable bearing of the flap, and a torsion bar can be introduced.

5. An aerodynamic profile having a forward profile area as well as a rearward profile area which is situated in a downward current and is bounded by a pressure-side covering skin as well as a suction-side covering skin, the pressure-side covering skin and the suction-side covering skin converging at the rearward profile area in a trailing profile edge, comprising:

a flap swivellably disposed in the rearward profile area on an underside of the pressure-side covering skin such that, in an inoperative condition, the flap, pointing in a flow direction, rests against a contour of the pressure-side covering skin and, in a deflected condition, encloses an angle with the pressure-side covering skin, and an airtight hinge connection integrated in the flap so that, on a side of the flap protected from wind, a turbulence system which improves flow conditions is formed, wherein the flap is made of unidirectionally and multidirectionally reinforced fiber composite arrangements which are sewn to one another, impregnated and hardened, and wherein, in the area of the unidirectionally reinforced fiber composite arrangement, a reinforced airtight loop area is created.

6. The aerodynamic profile according to claim 5, wherein a sliding material is insertable into the loop area for rotatable bearing of the flap, and a torsion bar can be introduced.

7. An aerodynamic profile having a forward profile area as well as a rearward profile area which is situated in a downward current and is bounded by a pressure-side covering skin as well as a suction-side covering skin, the pressure-side covering skin and the suction-side covering skin converging at the rearward profile area in a trailing profile edge, comprising:

a flap swivellably disposed in the rearward profile area on an underside of the pressure-side covering skin such that, in an inoperative condition, the flap, pointing in a flow direction, rests against a contour of the pressure-side covering skin and, in a deflected condition, encloses an anile with the pressure-side covering skin, and an airtight hinge connection integrated in the flap so that, on a side of the flay protected from wind, a turbulence system which improves flow conditions is formed wherein, in an area of transition to the flap, the pressure-side covering skin has an arching-in which is adapted to a shape of the hinge connection and the flap, and wherein the flap is made of a laminated folded-together prepreg material, an airtight loop area is formed along a fold in the material, a sliding material is inserted into the loop area for rotatable bearing of the flap, and a torsion bar can be introduced.

8. An aerodynamic profile having a forward profile area as well as a rearward profile area which is situated in a downward current and is bounded by a pressure-side covering skin as well as a suction-side covering skin, the pressure-side covering skin and the suction-side covering skin converging at the rearward profile area in a trailing profile edge, comprising:

a flap swivellably disposed in the rearward profile area on an underside of the pressure-side covering skin such that, in an inoperative condition, the flap, pointing in a flow direction, rests against a contour of the pressure-side covering skin and, in a deflected condition, encloses an angle with the pressure-side covering skin, and an airtight hinge connection integrated in the flay so that, on a side of the flap protected from wind, a turbulence system which improves flow conditions is formed, wherein the flap is of a fiber composite material, and wherein the flap is made of a laminated folded-together prepreg material, an airtight loop area is formed along a fold in the material, a sliding material is inserted into the loop area for rotatable bearing of the flap, and a torsion bar can be introduced.

9. An aerodynamic profile having a forward profile area as well as a rearward profile area which is situated in a downward current and is bounded by a pressure-side covering skin as well as a suction-side covering skin, the pressure-side covering skin and the suction-side covering skin converging at the rearward profile area in a trailing profile edge, comprising:

a flap swivellably disposed in the rearward profile area on an underside of the pressure-side covering skin such that, in an inoperative condition, the flap, pointing in a flow direction, rests against a contour of the pressure-side covering skin and, in a deflected condition, encloses an angle with the pressure-side covering skin, and an airtight hinge connection integrated in the flap so that, on a side of the flap protected from wind, a turbulence system which improves flow conditions is formed, wherein, in an area of transition to the flap, the pressure-side covering skin has an arching-in which is adapted to a share of the hinge connection and the flap, wherein the flap is made of unidirectionally and multidirectionally reinforced fiber composite arrangements which are sewn to one another, impregnated and hardened, and wherein, in the area of the unidirectionally reinforced fiber composite arrangement, a reinforced airtight loop area is created into which, for rotatable bearing of the flap, a sliding material is inserted and a torsion bar can be introduced.

10. An aerodynamic profile having a forward profile area as well as a rearward profile area which is situated in a downward current and is bounded by a pressure-side covering skin as well as a suction-side covering skin, the pressure-side covering skin and the suction-side covering skin converging at the rearward profile area in a trauma profile edge, comprising:

a flap swivellably disposed in the rearward profile area on an underside of the pressure-side covering skin such that, in an inoperative condition, the flap, pointing in a flow direction, rests against a contour of the pressure-side covering skin and, in a deflected condition, encloses an angle with the pressure-side covering skin, and an airtight hinge connection integrated in the flap so that, on a side of the flap protected from wind, a turbulence system which improves flow conditions is, formed, wherein the flap is of a fiber composite material, wherein the flap is made of unidirectionally and multidirectionally reinforced fiber composite arrangements which are sewn to one another, impregnated and hardened, and wherein, in the area of the unidirectionally reinforced fiber composite arrangement, a reinforced airtight loop area is created into which, for rotatable bearing of the flap, a sliding material is inserted and a torsion bar can be introduced.

11. An aerodynamic profile having a forward profile area as well as a rearward profile area which is situated in a downward current and is bounded by a pressure-side covering skin as well as a suction-side covering skin, the pressure-side covering skin and the suction-side covering skin converging at the rearward profile area in a trailing profile edge, comprising:

a flap swivellably disposed in the rearward profile area on an underside of the pressure-side covering skin such that, in an inoperative condition, the flap, pointing in a flow direction, rests against a contour of the pressure-side covering skin and, in a deflected condition, encloses an angle with the pressure-side covering skin, a connection profile arranged between the pressure-side covering skin and the suction-side covering skin, and an airtight hinge connection integrated in the flap so that, on a side of the flap protected from wind, a turbulence system which improves flow conditions is formed, wherein the rearward profile area can be exchangeably mounted by the connection profile on the forward profile area.

12. The aerodynamic profile according to claim 11, wherein the rearward profile area is exchangeably mounted by way of fastening devices.

13. The aerodynamic profile according to claim 12, wherein the fastening devices are rivets.

14. The aerodynamic profile according to claim 11, wherein the rearward profile area has a monolithic construction.

* * * * *